Dec. 17, 1968   F. C. BADALICH   3,416,859
MECHANICAL FOCUS MAINTAINING APPARATUS FOR A SLIDE PROJECTOR
Filed Sept. 28, 1966   3 Sheets-Sheet 1
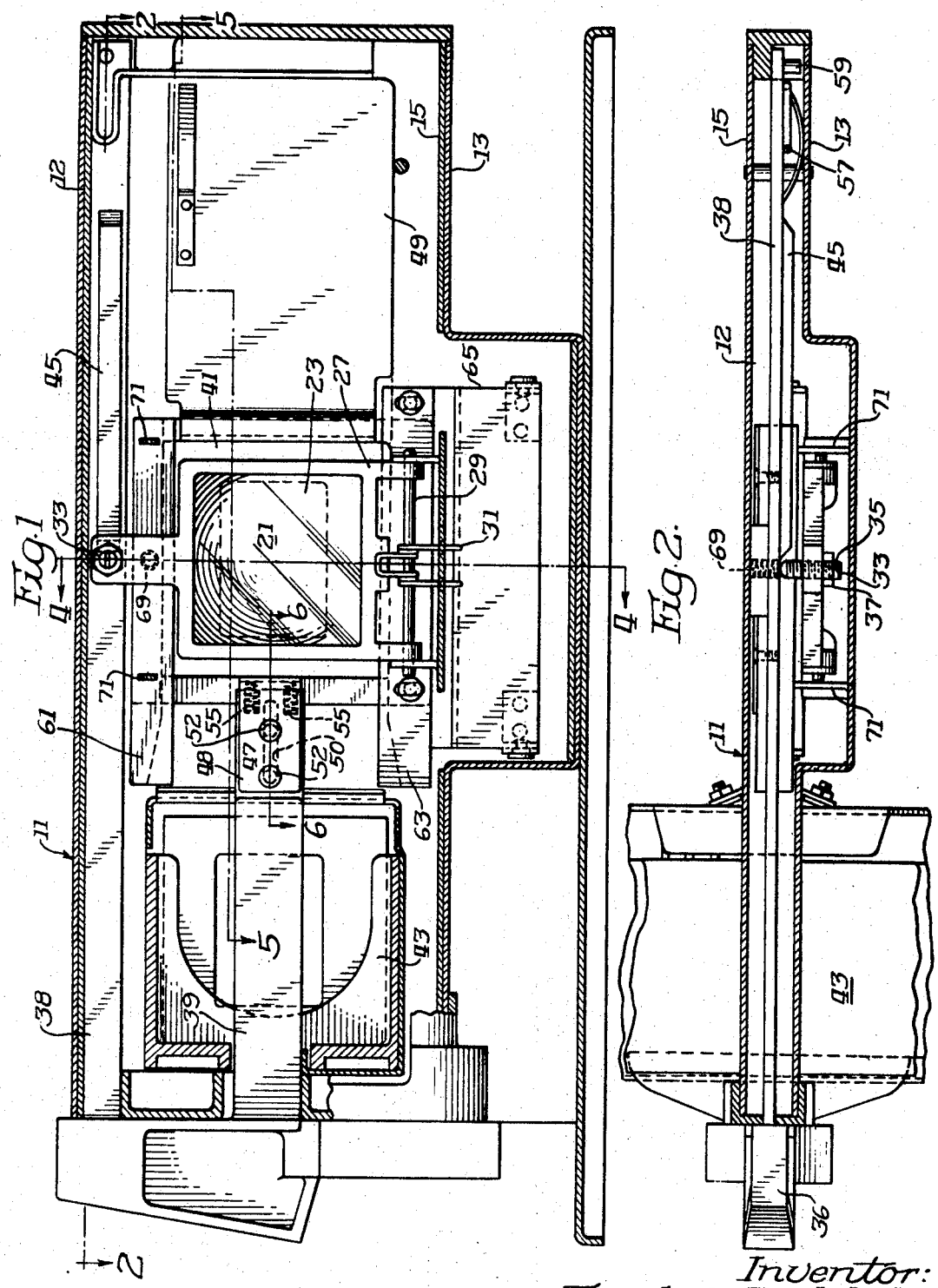
Inventor:
Frank C. Badalich
By Griffin & Branigan
Attys Dec. 17, 1968     F. C. BADALICH     3,416,859
MECHANICAL FOCUS MAINTAINING APPARATUS FOR A SLIDE PROJECTOR
Filed Sept. 28, 1966     3 Sheets-Sheet 2
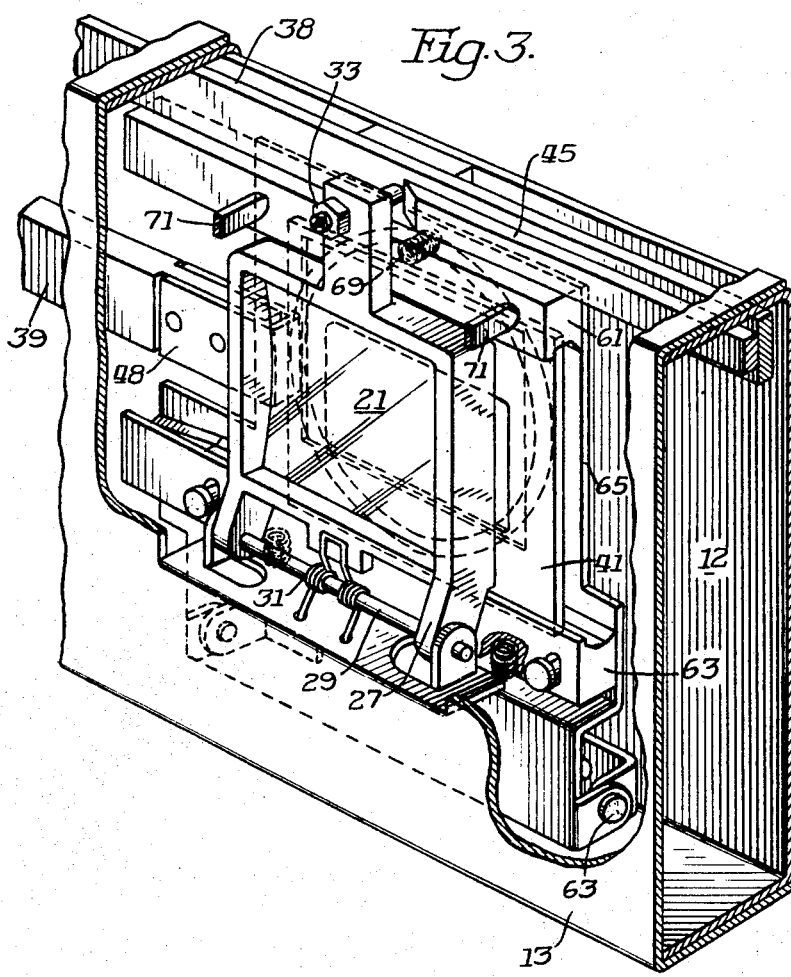
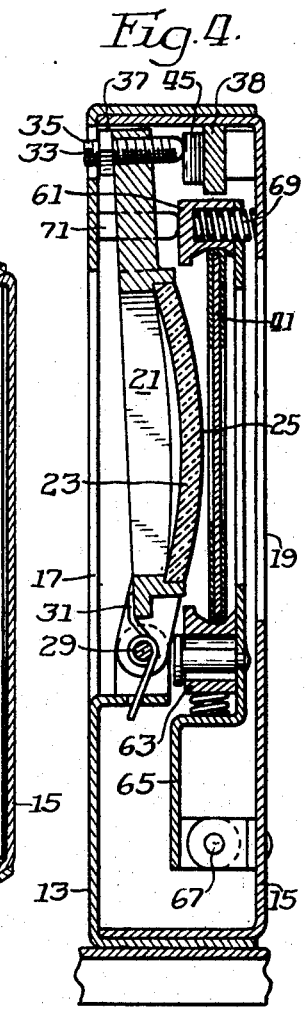
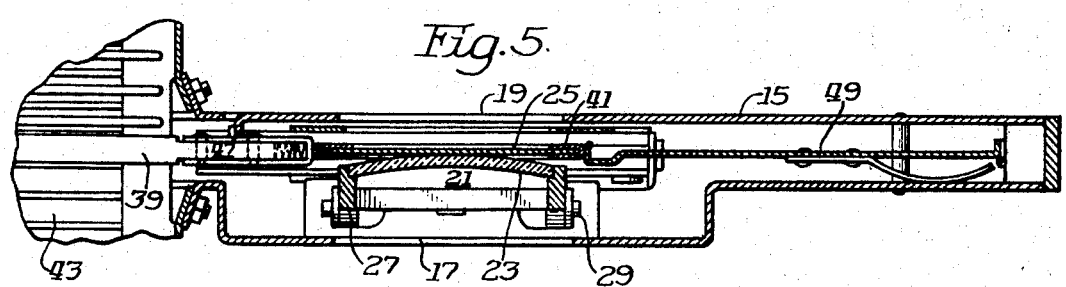
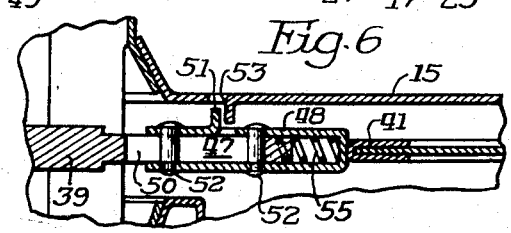
Inventor:
Frank C. Badalich.
By Griffin & Branigan Attys

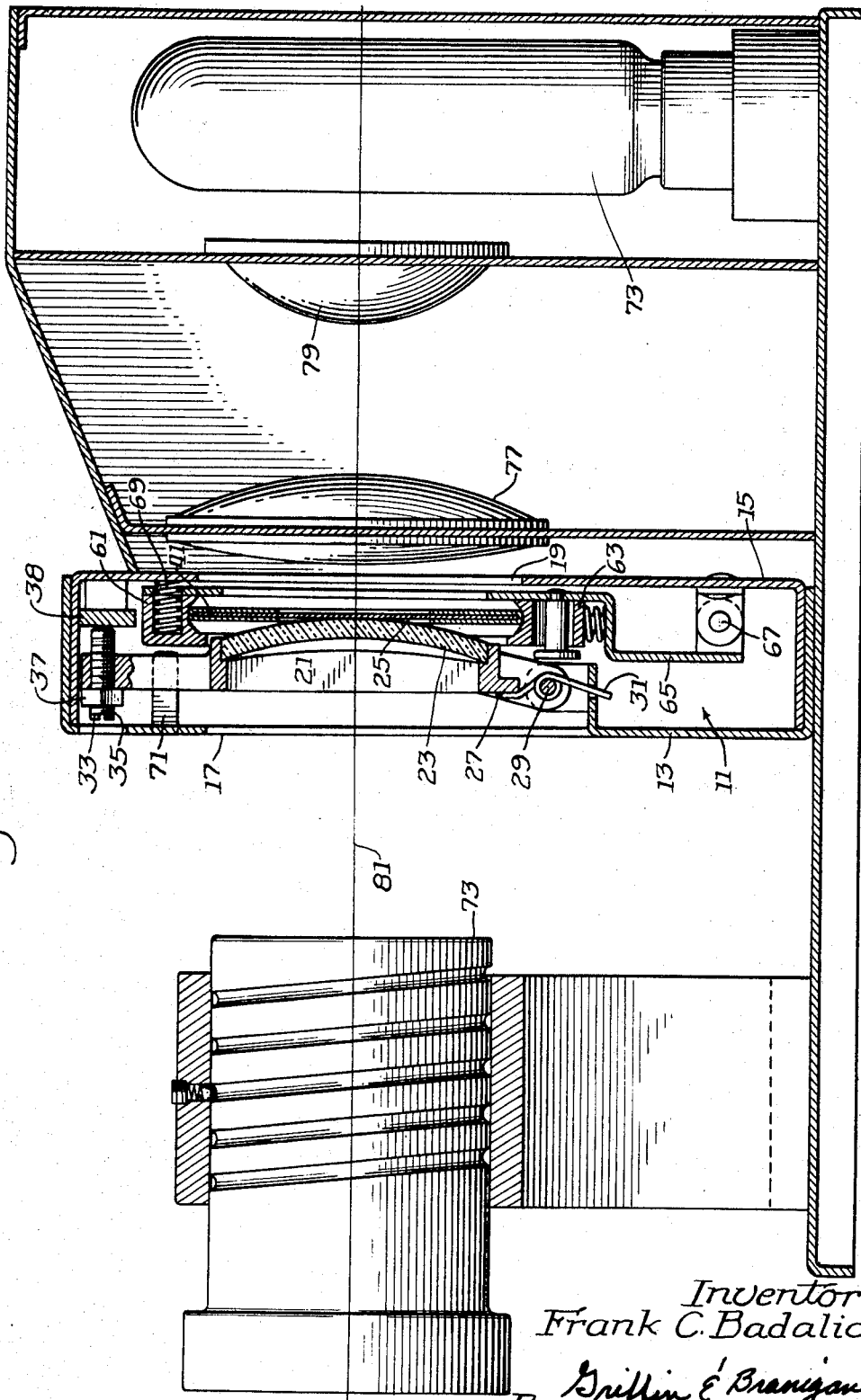

United States Patent Office 3,416,859
Patented Dec. 17, 1968

3,416,859
MECHANICAL FOCUS MAINTAINING APPARATUS FOR A SLIDE PROJECTOR
Frank C. Badalich, Chicago, Ill., assignor to Bell & Howell Company, Chicago, Ill., a corporation of Illinois
Filed Sept. 28, 1966, Ser. No. 582,714
6 Claims. (Cl. 353—69)

ABSTRACT OF THE DISCLOSURE

Apparatus for maintaining the focus of a slide projector by preventing "popping" of the film during projection. A lens is biased toward and is in contact with the film surface of a slide when the slide is in the projection station of the slide projector. At the same time, a slide holder holding the slide at the projection station biases the slide toward the lens. Hence, the film is held at a fixed position. In addition, a cam is provided for moving the lens out of contact with the slide when the slide is moved into or moved out of the projection station thereby preventing film scratching.

---

This invention relates to slide projectors and more particularly to slide projectors with mechanical means for automatically maintaining the focus of the projector after an initial focus adjustment has been made.

A slide projector is a device for projecting a transparent image on film mounted in a frame, more commonly called a slide, onto a screen. The slide projector generally comprises a projection mechanism, a slide changing mechanism, and a mechanism for varying the distance between the projection mechanism and the slide changing mechanism to focus the image on a screen. The projection mechanism includes a projection lens or a series of projection lenses mounted on one side of the slide changing mechanism and a lamp and a second lens or series of lenses mounted on the other side of the slide changing mechanism. The light from the lamp is adapted to pass through the lenses and the transparency onto a screen. The focus of a slide projector depends upon maintaining a particular distance between the slide and the projection lens for a particular distance between the projection lens and the screen. This distance, for best focus, places the film in the middle of, or coincident with, the focal plane of the projection lens. When "popping" occurs, which is a variation of the film from its normally flat position, the film moves out of the focal plane of the projection lens and the image projected on the screen is out of focus. An explanation of the cause and effect of film popping is more fully set forth in U.S. Patent No. 3,242,604 to Howard F. Ott; however, popping generally occurs when a slide is heated by the slide projector's lamp. Heating the slide causes the slide's film to bulge.

Although a conventional projection lens has a depth of field of approximately 1/64 of an inch at its focal point, the center portion of the image area of a slide transparency may move, due to popping, a total of 1/8 of an inch. This movement, caused by the heat generated by the projector's lamp, is unpredictable. While the time of movement is unpredictable the direction of movement is predictable. That is, popping normally occurs in the direction of the projection lens; i.e., the concave side of the film is toward the lamp and the convex side is toward the projection lens.

It will be appreciated that popping is undesirable. It requires that the slide projector operator manually refocus his machine each time it occurs. If it occurs at frequent intervals it is particularly distracting both to the viewers and to the operator since it requires constant refocusing.

The prior art has suggested various solutions to the problem of popping. Among them is the automatic focusing of the slide projector by sensing the popping of the film and then utilizing a servo control means to move a slide holding mechanism in a longitudinal direction, along the projection axis of the projection lens, to regain the desired relation between the slide and the projection lens. This system has the disadvantage of requiring a complicated slide loading and holding apparatus so that the slide can be moved relative to the projection lens. Further, this system requires apparatus for maintaining the slide in a vertical position while moving it in a direction perpendicular to its flat surfaces.

Another prior art system has also utilized a means for sensing the popping of the film. The output of the sensing means is then utilized through a servo system to control the location of the projection lens. That is, when the film pops a servo system is utilized to move the projection lens along its projection axis to regain the desired relation between the slide and the lens.

Both of the foregoing systems have the disadvantage of requiring complicated electronic circuitry to sense the slide popping and to control the servo system. In general, the sensing or appraisal systems of these types of devices include a light mounted on the projection lens and focused on the center of the slide. The light is adapted to impinge on the slide at a slight angle with the projection axis of the projection lens. This light is reflected and detected by a photocell which is also mounted on the projection lens. The systems are designed such that when the film pops the light impinging on the photocell changes. When the impinging light changes the photocell output also changes. The change in the photocell output is utilized to control the system to move either the lens or the slide until focus is reachieved. Hence, these systems are both electronically and electromechanically complicated making them rather expensive.

Another prior art system for maintaining the focus of a slide projector involves the use of a meniscus lens adapted to touch the film of the slide and to move with the movement of the film. A spring is mounted between the meniscus lens and the projection lens. When the film pops the meniscus lens follows the film movement and the projection lens moves with the meniscus lens; hence, a constant distance between the projection lens and the film is maintained. However, this system has not proven to be entirely satisfactory. The system depends upon spring constants which change with age and use. The system further depends upon the force exerted on the meniscus lens by the film. This force must be very small to prevent scratching of the film. However, any slight friction in the mechanisms which slidingly support the meniscus lens and the projection lens overcomes the small force exerted by the film. This causes incorrect focusing.

Accordingly, it is an object of this invention to provide a new and improved mechanical means for automatically maintaining the focus of a slide projector.

It is another object of this invention to provide a new and improved mechanical means for automatically maintaining the focus of a slide projector.

It is a further object of this invention to provide a simple, uncomplicated, mechanical apparatus for automatically maintaining the focus of a slide projector.

In accordance with a principle of the invention a means is provided for moving a meniscus lens into and out of engagement with the transparent surface of a slide. The meniscus lens is moved out of engagement with the surface when a slide is being inserted into or removed from the projector. When the slide located at its desired position along the projection axis of the projection lens the meniscus lens is moved into contact with it. In addition to the meniscus lens being movable the slide holder is also slightly movable. The slide holder is spring biased to force the slide's film against the meniscus lens. If the slide pops the spring bias maintains the film against the lens.

In accordance with a further principle of the invention the slide holder is adapted to control the movement of the meniscus lens into and out of contact with the film. A means is provided which cooperates with the slide holder to bias the meniscus lens out of engagement with the film when a slide is being inserted or removed from the machine. When the slide is in its desired position the bias is removed to allow the meniscus lens to move into engagement with the film.

It will be appreciated that providing a meniscus lens to control the position of the film results in a very simple device for maintaining the focus of a slide projector. Specifically, all that is required is a system for moving a meniscus lens into and out of engagement with the slide film. Preferably, this system operates in conjunction with the insertion or removal of the slide. When the slide is in its projection position the meniscus lens in cooperation with the slide holder maintains the slide film in the desired projection position and prevents it from popping from that position to an out of focus position.

The foregoing objects and many of the attendant advantages of this invention will become more readily appreciated as the same becomes better understood by reference to the following detailed description when taken in conjunction with the accompanying drawings wherein:

FIG. 1 is a sectional view looking down the projection axis of a slide projector illustrating the slide focusing mechanism of the invention in cooperation with a manual slide loader;

FIG. 2 is a cross-sectional view taken along line 2—2 of FIG. 1;

FIG. 3 is a perspective view illustrating the slide focusing mechanism of the invention with portions broken away to more clearly illustrate the invention;

FIG. 4 is a cross-sectional view taken on line 4—4 of FIG. 1;

FIG. 5 is a cross sectional view taken on line 5—5 of FIG. 1;

FIG. 6 is a cross-sectional view taken on line 6—6 of FIG. 1; and

FIG. 7 is a cross-sectional view similar to FIG. 4 but extended to show the projection light source, the condenser elements, and the projection lens of a projector.

For ease of illustration the automatic focusing mechanism of the invention is described in conjunction with a manual slide loading mechanism. A manual slide loading mechanism of the type illustrated in the drawing and hereinafter described is more fully described in U.S. Patent No. 2,724,989 to F. C. Badalich. However, while the invention is described in conjunction with a manual slide loading mechanism it will be appreciated by those skilled in the art and others that the invention is equally suitable for use with other slide loading mechanisms. Specifically, the invention can be utilized with automatic slide loading mechanisms as well as with other types of manual slide loading mechanisms.

Turning now to the drawings wherein like reference numerals designate like parts throughout the several views, there is shown in FIGS. 1 and 2 a slide changing mechanism of the type described in the foregoing patent (2,724,989) generally designated by reference character 11. The slide loading mechanism 11 includes a housing 12 preferably made of sheet metal. The housing comprises a forward member 13 and a rearward member 15. The forward member 13 has its top edge and its bottom edge extended rearwardly to overlie similar but forwardly extending edges of the rearward member. The forward and rearward members comprising the housing 12 have openings 17 and 19, respectively, for light passage.

The slide focusing mechanism of the invention generally designated as 21 is mounted in the housing of the slide loading mechanism 11. The focusing mechanism 21 comprises a meniscus lens 23 having a convex surface 25 mounted in a frame 27. The frame is pivoted at 29 to the forward member 13 of the housing 11. A torsion spring 31 surrounds the pivot 29 and is anchored at one end to the forward member 13 and at its other end bears on the lower end of frame 27 to urge the frame in a clockwise direction as viewed in FIGS. 4 and 7. At the upper end of the frame 27 an adjustable stop 33 is provided which is adjusted to limit the clockwise rotation of the frame to a desired position. Preferably, the frame is substantially vertical when it is in its desired position. As hereinafter more fully described this desired position is at the focal plane of the projector's projection lens when a slide has been inserted into the machine and is being projected; i.e., the slide is at its projection position. The stop 33 as illustrated in FIGS. 4 and 7 comprises a bolt 35 and a nut 37. The bolt is adapted to screw through the frame 27 and the nut is adapted to lock it in position. The inner end of the bolt 35 is adapted to cooperate with the slide loading mechanism as hereinafter described.

The slide loading mechanism 11 has a manual gripping member 36 with an upper bar 38 and a lower bar 39 affixed thereto and is adapted as described in the foregoing U.S. patent to Badalich to bring a slide 41 from a slide tray 43 to a projection station and to return the slide from the station to the tray. The upper bar 38 is the member against which the stop 33 rests when the meniscus lens 23 is in its projection position. The meniscus lens 23 is in the projection position when its convex surface 25 is in contact with the slide film.

Affixed to the upper bar 38 is a cam member 45. The cam member is operative in conjunction with the stop 33 to move the meniscus lens 23 out of contact with the film when the slide is moved to the left as illustrated in FIGS. 1 and 3. This permits the slide to be inserted or removed from the projection station without contact between the slide film and the convex side 25 of the meniscus lens 23. Preferably, the camming action is so arranged that upon insertion of the slide 41 the slide is first brought to its stop position before the lens surface contacts the film surface. Likewise, the lens surface is removed from contact with the film surface before the slide is moved to return it to the tray.

To effect the foregoing movement of the lens after movement of the slide either upon insertion or prior to movement of the slide upon removal, a lost motion is necessary; that is, there must be a loss of slide motion during these two periods of time.

The lost motion requirement is accomplished during slide insertion by a spring loaded tip 47 mounted on the end of the lower bar 39 which end pushes a slide 41 out of the slide tray 43 into the projection station. The spring loaded tip preferably comprises a U-shaped sheet metal member 48 (FIG. 3) and a pair of springs 55 (FIG. 1) mounted over the end of the lower bar 39. The springs 55 are mounted between the outer end of the lower bar 39 and the inner side of the cross element of the U-shaped member 48. The lower bar 39 includes a slot 50. The slot is adapted to fit over a pair of rods 52 extending through the lower bar 39 and fixedly attached to each leg of the U-shaped member 48. The distance between the rods 52 is less than the length of the slot 50 so that the U-shaped member can move toward the handle 36 when the springs 55 are compressed and away from the handle when the springs are released.

A shutter member 49 (FIG. 5) is located on the opposite side of the slide and is pushed by the slide when the lower bar 39 pushes a slide. Hence, the shutter member 49 precedes a slide when a slide is inserted into the machine, and, as hereinafter described, follows a slide when the slide is being removed from the machine.

The proper positioning of the slide at the projection station is effected by a rearwardly bent ear 51 (FIG. 6)

on the spring loaded tip 47. The rearwardly bent ear 51 engages a forwardly bent ear 53. The forwardly bent ear extends from the rearward member 15 of the housing 12.

When a slide is inserted into the machine it moves to the projection station, at which time the shutter 49 reaches the end of the housing and stops. Further movement of the bar 39 as viewed in FIGS. 1 and 5 compresses the springs 55 of the spring loaded tip 47. Compression of the springs causes no further movement of the slide. During this last movement (compression of the springs) the stop 33 drops off of the cam 45 allowing the convex surface 25 of the meniscus lens 23 to contact the surface of the slide film. Hence, the system provides a means for inserting a slide into the projection station of the slide and allowing the focus maintaining mechanism to contact the slide only after it has reached a stopped position. This system provides a means for preventing scratching of the slide film.

Turning now to the means for removing the meniscus lens from contact with the slide prior to moving the slide from the machine to prevent scratching during removal, this means comprises a formed wire member 57 (FIG. 2) arranged to be contacted by a pin 59 affixed to the upper bar 38. The formed wire member is free at its upper end and fixedly attached to the shutter 49 at its lower end. Initial movement of the upper bar to the left as viewed in FIG. 1 brings cam 45 into engagement with stop 33 to move the lens carrying holder 27 to its inoperative position. The slide does not move because the pin 59 has not yet moved into engagement with the formed wire member 57. Further movement of the bar 38 to the left now causes the pin 59 to engage the formed wire member 57. This further movement causes movement of the shutter 49 to push the slide from the projection station back into the tray 43.

It will be appreciated by those skilled in the art that the foregoing description has described a lost motion system for inserting a slide into and removing a slide from a projection station in a projector. Moreover, the foregoing description has described a means for moving a meniscus lens into and out of contact with a slide during the lost motion so that there is no contact between the slide annd the lens during slide motion. This prevention of contact during slide motion results in a system for preventing the scratching of a slide during its insertion or removal. Further, the movement of the meniscus lens into engagement with the slide will, as hereinafter described, maintain the slide in focus.

In FIG. 3, the slides pass to and from the slide tray 43 and are held in position at the projection station by an upper slide track 61 and a lower slide track 63. The upper slide track 61 is rigidly mounted to a slide track carrying member 65 pivotally attached at 67 to the rear member 15 of the housing 12. The lower slide track member 63 is movably attached to the slide track carrying member 65 and is spring biased in an upward direction toward the upper slide track member 61 within the limits of a pin and slot type of connection.

The slide track carrying member 65 is urged to rotate about its pivot 67 in a counterclockwise direction, as viewed in FIGS. 4 and 7, by a spring 69. A pair of stop members, best illustrated in FIG. 3, comprising ears 71 lanced out and bent rearwardly from the forward housing member 13 limit the counter-clockwise movement of the slide track carrying member 65 when the slide is moving into or out of the projection station.

When the slide is at the projection station the spring 69 pivots the slide track carrying member 65 about the pivot 67 in a counter clockwise direction as viewed in FIGS. 4 and 7 to create a force tending to tilt the slide toward the meniscus lens. Meanwhile, the lens frame is pivoted by the torsion spring 31 in a clockwise direction to tilt the meniscus lens against the film. Hence, when the slide is in the projection station a force and a counter acting force are formed. However, the torsion spring 31 forcing the meniscus lens 23 in the clockwise direction is much stronger than the spring 69 forcing the slide track carrying member 65 in the counter clockwise direction. Therefore, when the film pops the meniscus lens will retain its position and the slide carrying member 65 will move to a new position. Whether the slide pops in a convex forward or a convex rearward direction the spring bias on the slide track member will maintain the slide at the convex surface of the meniscus lens.

From the foregoing description it will be appreciated that a simple device for maintaining a slide at a fixed position has been disclosed. FIG. 7, which is a sectional view of a projector incorporating the above described apparatus, illustrates how this apparatus maintains the focus of a projector. FIG. 7 comprises a projection lens system 73, a lamp 75 and a pair of light condensing lenses 77 and 79. In addition FIG. 7 illustrates the housing 11 and its associated mechanical focus maintaining mechanism 21 as hereinabove described. The projection lens system 73, the lamp 75, the condensing lenses 77 and 79, the openings 17 and 19 in the housing, and the slide 41 are all mounted along an axis 81 which is the projection axis of the projector. In operation a slide 41 is initially inserted into the machine and the convex surface 25 of the meniscus lens 23 moves against the slide surface in the manner previously described. Thereafter, the projection lens 73 is focused so that a clear image is shown on a screen (not shown). No further focusing of the projection lens 73 is thereafter required. The projection lens is illustrated as a threaded tubular structure. As is well known, this type of lens is focused by manually rotating it until its inner focal point and the plane of the slide film coincide. At this point the slide is in focus. The projection lens focusing arrangement illustrated in FIG. 7 is merely by way of example and any system for longitudinally moving the projection lens is satisfactory. After the initial focus has been achieved the slide in the machine and future slides are automatically focused and their focus is maintained if they pop. Specifically, if a slide pops toward the rear the bias spring 69 forces the slide track carrying member 65 forward to maintain the slide film in contact with the meniscus lens convex surface 25. In addition, if the slide pops forward it creates more tension on the spring 69 and tilts the slide track carrying member 65 toward the rear. In either case, the meniscus lens maintains its position which is at the focal point of the projection lens for a particular setting of the projection lens. The slide popping does not move the meniscus lens. Specifically, the meniscus lens and the pivotal arrangements hereinabove described maintain the slide in a desired focus position.

It will be appreciated by those skilled in the art that the foregoing describes a simple means for mechanically focusing a slide. Provision is made for inserting and removing slides from a slide projector without scratching the surface of the slides. Specifically, a simple movable lens arrangement is provided for moving out of contact with a slide when it is being inserted or removed from the projector and for moving into contact with the slide to maintain the slide in a desired position after the slide has reached the projection station of the projector. Maintaining the slide at a desired position maintains the focus of the projector.

It is to be understood that the foregoing disclosure relates to only one embodiment of the invention and that numerous modifications or alterations may be made therein without departing from the spirit and scope of the invention as set forth in the appended claims.

The embodiments of the invention in which an exclusive property or privilege is claimed are defined as follows:

In the claims:

1. Apparatus for maintaining the focus of a slide projector by preventing "popping" of the film during projection wherein the film is illuminated from a light source and is projected along a projection axis by a projection lens with its focal point located at the film plane comprising:

lens means including a meniscus lens having a convex surface contacting the film surface of a slide when the slide is at the projection station of the slide projector, a frame adapted to hold said meniscus lens and a spring adapted to rotate said frame and lens in a direction to move the surface of said lens into contact with said film;

slide holder means for holding the slide at said projection station and biasing the slide toward said lens means including an upper slide track, a lower slide track, a slide carrying member having an upper and lower end and a spring, said upper slide track being fixedly attached to said slide track carrying member at its upper end, said lower slide track movably attached at its lower end and said spring means being adapted to bias the upper end of said slide track carrying member toward said meniscus lens; and third means operatively connected to said lens means to move said meniscus lens out of contact with said slide means when a slide is inserted into or removed from the projection station of said slide projector.

2. Apparatus as claimed in claim 1 wherein said third means comprises a slide loading means including a cam, said cam adapted to operatively coact with said lens frame to move said meniscus lens out of contact with said slide when a slide is being inserted or removed from said projector.

3. Apparatus as claimed in claim 2 wherein said coaction between said cam and said lens frame creates a dead zone between the time said meniscus lens moves out of contact with said slide and said slide is removed from said projector.

4. Apparatus as claimed in claim 3 including a housing wherein said apparatus is mounted.

5. Apparatus as claimed in claim 4 wherein said concave surface of said meniscus lens is facing the projection lens of said projector and the film is mounted between said meniscus lens and the lamp of said projector.

6. Apparatus as claimed in claim 2 wherein said coaction between said cam and said lens frame creates a dead zone between the time said slide reaches its projection station and said meniscus lens moves into contact with said slide when a slide is inserted; and a dead zone between the time said meniscus lens moves out of contact with said slide and said slide is removed from said projector.

References Cited

UNITED STATES PATENTS

| 3,301,129 | 1/1967 | Henriksen | 88—26 XR |
| 1,636,647 | 7/1927 | Patterson | 88—24 |

FOREIGN PATENTS 553,197  2/1958  Canada.

NORTON ANSHER, *Primary Examiner.*

RICHARD M. SHEER, *Assistant Examiner.*

U.S. Cl. X.R.

352—140